US012163673B2

United States Patent
Pingale et al.

(10) Patent No.: US 12,163,673 B2
(45) Date of Patent: *Dec. 10, 2024

(54) COMPOSITE INTERCONNECTION CONDUITS FOR HVAC SYSTEMS

(71) Applicant: Tyco Fire & Security GmbH, Neuhausen am Rheinfall (CH)

(72) Inventors: Sarjerao Pingale, Pune (IN); Manjur Tamboli, Norman, OK (US); Neelkanth S. Gupte, Katy, TX (US); Anand Talikot, Belgaum (IN); Baskaran Kandhappan, Chennai (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,812

(22) Filed: Sep. 11, 2023

(65) Prior Publication Data

US 2023/0417427 A1 Dec. 28, 2023

Related U.S. Application Data

(63) Continuation of application No. 17/473,795, filed on Sep. 13, 2021, now Pat. No. 11,754,298, which is a
(Continued)

(51) Int. Cl.
*F24F 1/03* (2019.01)
*B23K 1/00* (2006.01)

(52) U.S. Cl.
CPC .............. *F24F 1/03* (2019.02); *B23K 1/0008* (2013.01); *F24F 2221/16* (2013.01)

(58) Field of Classification Search
CPC ........ F24F 1/03; F24F 2221/16; F24F 1/0326; F24F 1/26; B23K 1/0008; B23K 2103/18;
(Continued)

(56) References Cited

U.S. PATENT DOCUMENTS

| 2,979,924 A | 4/1961 | Balogh |
| 3,830,262 A * | 8/1974 | Lago ...................... F16L 13/08 |
| | | 138/143 |

(Continued)

FOREIGN PATENT DOCUMENTS

| CN | 202204212 U | 4/2012 |
| CN | 203163178 U * | 8/2013 |
| EP | 2671670 A1 | 12/2013 |

OTHER PUBLICATIONS

English Translation of CN-203163178-U (Jinlong) as tranlsated by Espacenet. (Year: 2013).*

*Primary Examiner* — Steve S Tanenbaum
(74) *Attorney, Agent, or Firm* — Fletcher Yoder, P.C.

(57) ABSTRACT

A heating, ventilation, and/or air conditioning (HVAC) packaged unit includes a first refrigerant circuit component configured to change a temperature or a pressure of a refrigerant flowing through the first refrigerant circuit component and a second refrigerant circuit component configured to change a temperature or a pressure of the refrigerant flowing through the second refrigerant circuit component. The first and the second refrigerant circuit components are within a common refrigerant circuit that is disposed within a common support structure. The HVAC packaged unit also includes an interconnection conduit having a length formed from aluminum, a first end segment coupled to a first end of the length, and a second end segment coupled to a second end of the length. The first end segment and the second end segment are each formed from copper, and the interconnection conduit extends between the first refrigerant circuit component and the second refrigerant circuit component.

20 Claims, 7 Drawing Sheets

Related U.S. Application Data continuation of application No. 16/289,102, filed on Feb. 28, 2019, now Pat. No. 11,118,795.

(60) Provisional application No. 62/803,059, filed on Feb. 8, 2019.

(58) Field of Classification Search
CPC .. B23K 2103/10; B23K 2103/12; B23K 1/19; B23K 2101/06
USPC .......................................................... 62/299
See application file for complete search history.

(56) References Cited

U.S. PATENT DOCUMENTS

| | | | |
|---|---|---|---|
| 4,023,557 A * | 5/1977 | Thorne | B21C 1/22 126/677 |
| 2008/0257533 A1 | 10/2008 | Rottmann | |
| 2012/0211208 A1 | 8/2012 | Jin | |
| 2012/0272669 A1 | 11/2012 | Blanton et al. | |
| 2013/0125578 A1 | 5/2013 | Lee et al. | |
| 2014/0286753 A1 * | 9/2014 | Maganhoto | F04B 39/12 415/121.3 |
| 2016/0033181 A1 | 2/2016 | Leezer et al. | |

* cited by examiner

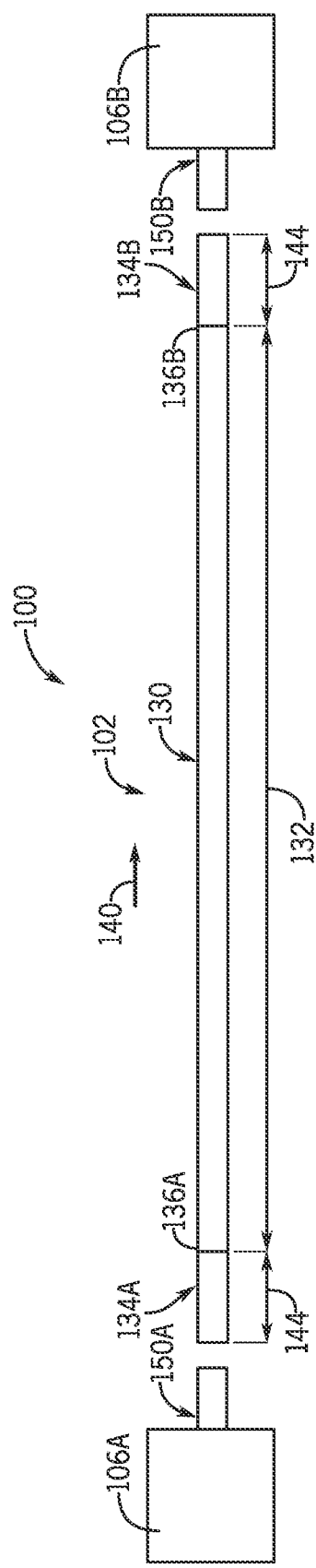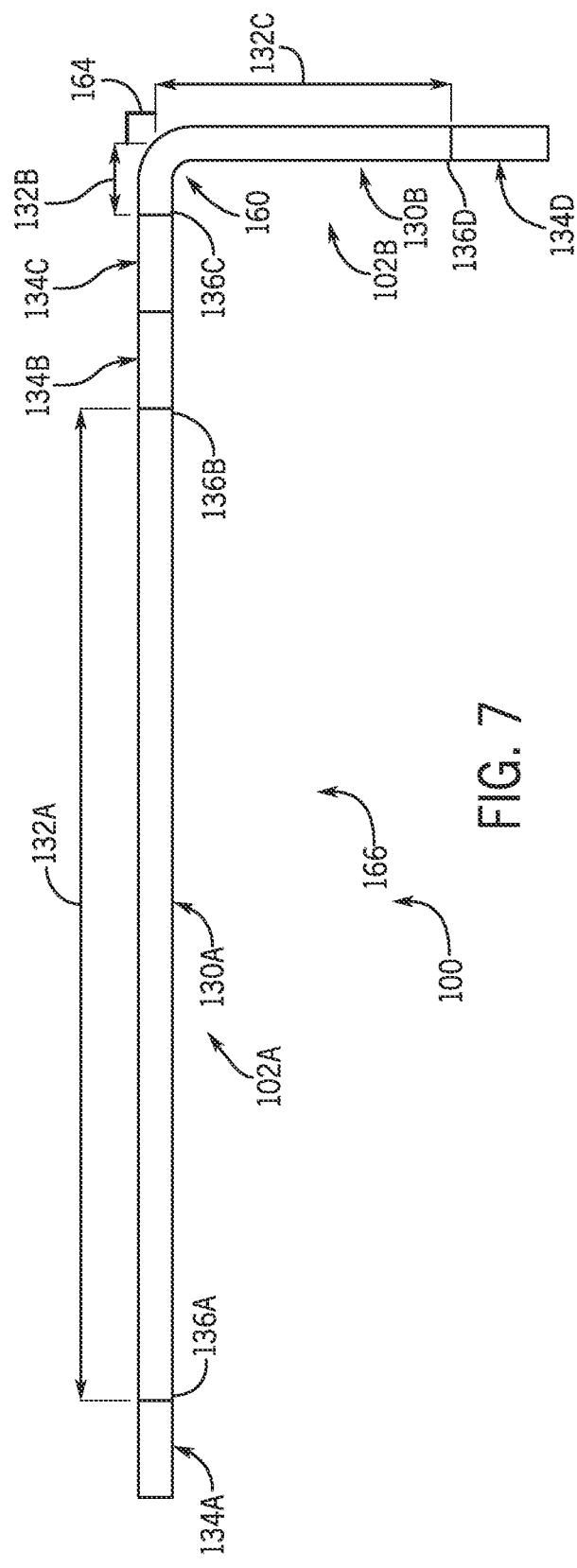

COMPOSITE INTERCONNECTION CONDUITS FOR HVAC SYSTEMS

CROSS REFERENCE TO RELATED APPLICATION

This is a continuation of U.S. patent application Ser. No. 17/473,795, entitled "COMPOSITE INTERCONNECTION CONDUITS FOR HVAC SYSTEMS," filed Sep. 13, 2021, which is a continuation of U.S. patent application Ser. No. 16/289,102, entitled "COMPOSITE INTERCONNECTION CONDUITS FOR HVAC SYSTEMS," filed Feb. 28, 2019, which claims priority from and the benefit of U.S. Provisional Application No. 62/803,059, entitled "COMPOSITE INTERCONNECTION CONDUITS FOR HVAC SYSTEMS," filed Feb. 8, 2019, each of which is hereby incorporated by reference in its entirety for all purposes.

BACKGROUND

The present disclosure relates generally to heating, ventilation, and/or air conditioning (HVAC) systems, and more particularly to composite interconnection conduits for HVAC systems.

A wide range of applications exists for HVAC systems. For example, residential, light commercial, commercial, and industrial systems are used to control temperatures and air quality in indoor environments and buildings. Such systems may be dedicated to either heating or cooling, although systems are common that perform both of these functions. Very generally, these systems operate by implementing a thermal cycle in which fluids are heated and cooled to provide air flow at desired temperature to a controlled space, typically the inside of a residence or building. For example, a refrigerant circuit may circulate a refrigerant through one or more heat exchangers to exchange thermal energy between the refrigerant and one or more fluid flows, such as a flow of air. Generally, HVAC systems may include interconnection conduits formed from materials, such as copper, that fluidly couple the heat exchangers and other components of the refrigerant circuit. Unfortunately, materials traditionally utilized in interconnection conduits may contribute to an increase in costs and/or weight of HVAC systems.

SUMMARY

In one embodiment of the present disclosure, a heating, ventilation, and/or air conditioning (HVAC) packaged unit includes a first refrigerant circuit component configured to change a temperature or a pressure of a refrigerant flowing through the first refrigerant circuit component and a second refrigerant circuit component configured to change a temperature or a pressure of the refrigerant flowing through the second refrigerant circuit component. The first refrigerant circuit component and the second refrigerant circuit component are within a common refrigerant circuit that is disposed within a common support structure. The HVAC packaged unit also includes an interconnection conduit having a length formed from aluminum, a first end segment coupled to a first end of the length, and a second end segment coupled to a second end of the length. The first end segment and the second end segment are each formed from copper, and the interconnection conduit extends between the first refrigerant circuit component and the second refrigerant circuit component.

In another embodiment of the present disclosure, a heating, ventilation, and/or air conditioning (HVAC) packaged unit includes an enclosure, a first refrigerant circuit component having a first end joint, disposed within the enclosure, and configured to change an operating condition of a refrigerant flowing through the first refrigerant circuit component. The HVAC packaged unit includes a second refrigerant circuit component having a second end joint, disposed within the enclosure, and configured to change the operating condition of the refrigerant flowing through the second refrigerant circuit component. The first refrigerant circuit component and the second refrigerant circuit component are within a common refrigerant circuit. The HVAC packaged unit also includes an interconnection conduit having a length formed from aluminum, a first end segment coupled to a first end of the length, and a second end segment coupled to a second end of the length. The first end segment is brazed to the first end joint, and the second end segment is brazed to the second end joint.

In a further embodiment of the present disclosure, a heating, ventilation, and/or air conditioning (HVAC) packaged unit includes a first refrigerant circuit component configured to change an operating condition of a refrigerant flowing through the first refrigerant circuit component and a second refrigerant circuit component configured to change the operating condition of the refrigerant flowing through the second refrigerant circuit component. The first refrigerant circuit component and the second refrigerant circuit component are within a common refrigerant circuit that is disposed within a common support structure. The HVAC packaged unit includes a first interconnection conduit having a first length formed from aluminum, a first end segment coupled to a first end of the first length, and a second end segment coupled to a second end of the first length. The HVAC packaged unit also includes a second interconnection conduit having a second length formed from aluminum, a third end segment coupled to a third end of the second length, and a fourth end segment coupled to a fourth end of the first length. The first end segment, the second end segment, the third end segment, and the fourth end segment are each formed from copper. Additionally, the first interconnection conduit extends between the first refrigerant circuit component and the second interconnection conduit, and the second interconnection conduit extends between the first interconnection conduit and the second refrigerant circuit component.

In another embodiment of the present disclosure, a method for constructing a heating, ventilation, and/or air conditioning (HVAC) packaged unit includes forming an interconnection conduit by brazing a first end of a first conduit end segment formed from copper to a first end of a main conduit body formed from aluminum and brazing a first end of a second conduit end segment formed from copper to a second end of the main conduit body. The method also includes brazing a second end of the first conduit end segment to a first end joint of a first refrigerant circuit component. Additionally, the method includes brazing a second end of the second conduit end segment to a second end joint of a second refrigerant circuit component to form a partial refrigerant circuit assembly including the interconnection conduit extending between the first refrigerant circuit component and the second refrigerant circuit component. The method further includes disposing the partial refrigerant circuit assembly in an enclosure of the HVAC packaged unit.

Other features and advantages of the present application will be apparent from the following, more detailed descrip-

BRIEF DESCRIPTION OF THE DRAWINGS

FIG. 6 is a schematic side view of an embodiment of a composite interconnection conduit and components of an HVAC packaged unit, in accordance with an aspect of the present disclosure;

FIG. 7 is a schematic side view of an embodiment of a first composite interconnection conduit coupled to a second interconnection conduit, in accordance with an aspect of the present disclosure;

DETAILED DESCRIPTION

The present disclosure is directed to composite interconnection conduits for an HVAC system. Interconnection conduits fluidly couple components of the HVAC system, such as evaporators, compressors, condensers, and expansion devices of one or multiple refrigerant circuits to enable refrigerant to cyclically flow therethrough. However, use of entirely copper interconnection conduits may significantly contribute to both a material cost and a weight of an HVAC system. To provide lighter and more cost effective HVAC systems, the presently-disclosed composite interconnection conduits have a main section formed from aluminum and end segments or end portions formed from copper. As discussed in more detail herein, the end segments may be brazed onto the main section during a manufacturing process, thus enabling pre-formed interconnection conduits to be assembled with refrigerant circuit components in a traditional copper-to-copper brazing process. That is, because the end segments of the composite interconnection conduits are formed from copper, they may be brazed to copper end segments of the refrigerant circuit components during assembly of the HVAC system without additional or specialized brazing techniques. Accordingly, the composite interconnection conduits enable a reduction in both material costs and weight of an HVAC system without complicating the assembly process for the HVAC system.

Figure 1:
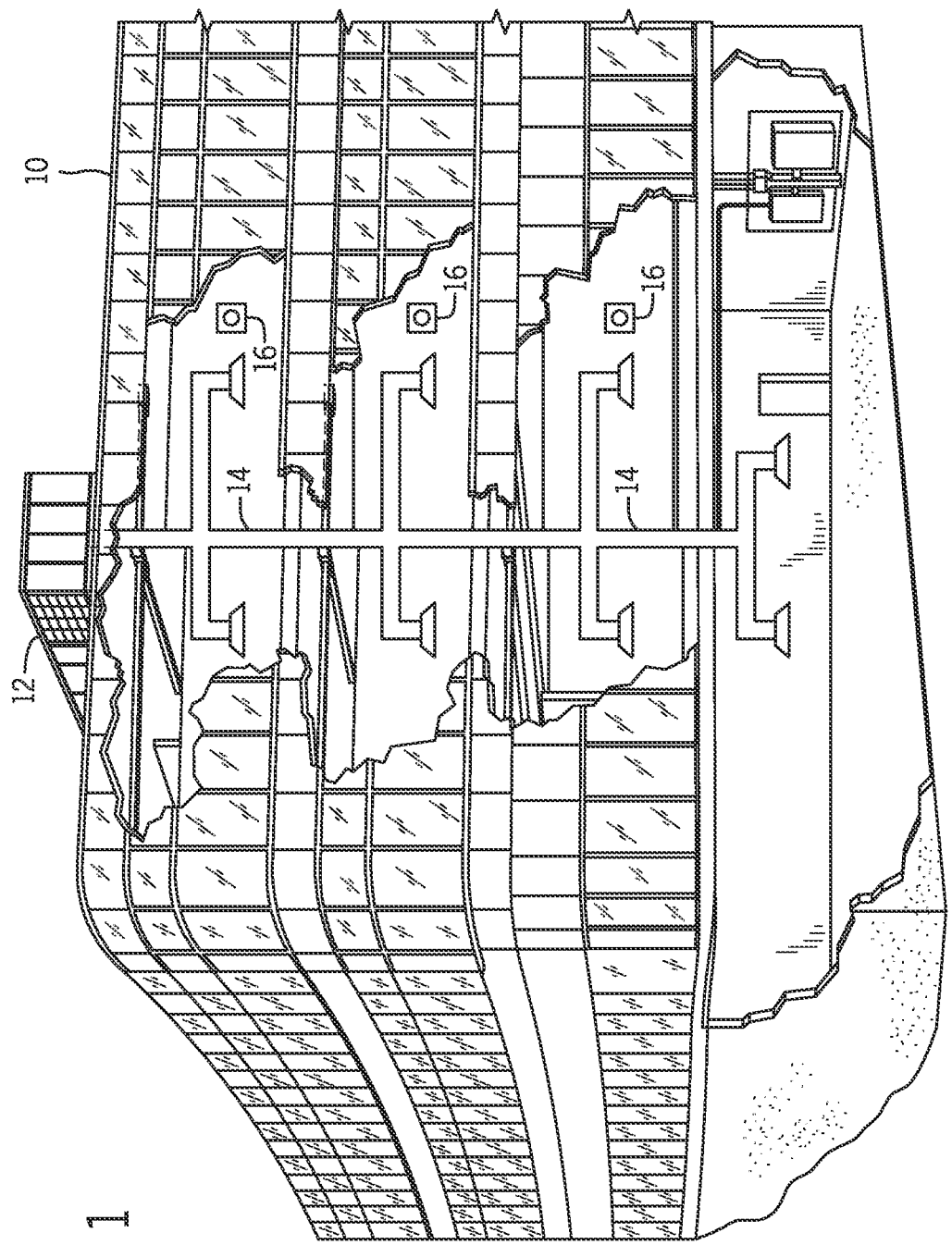
FIG. 1 is a perspective view of an embodiment of a commercial or industrial HVAC system, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
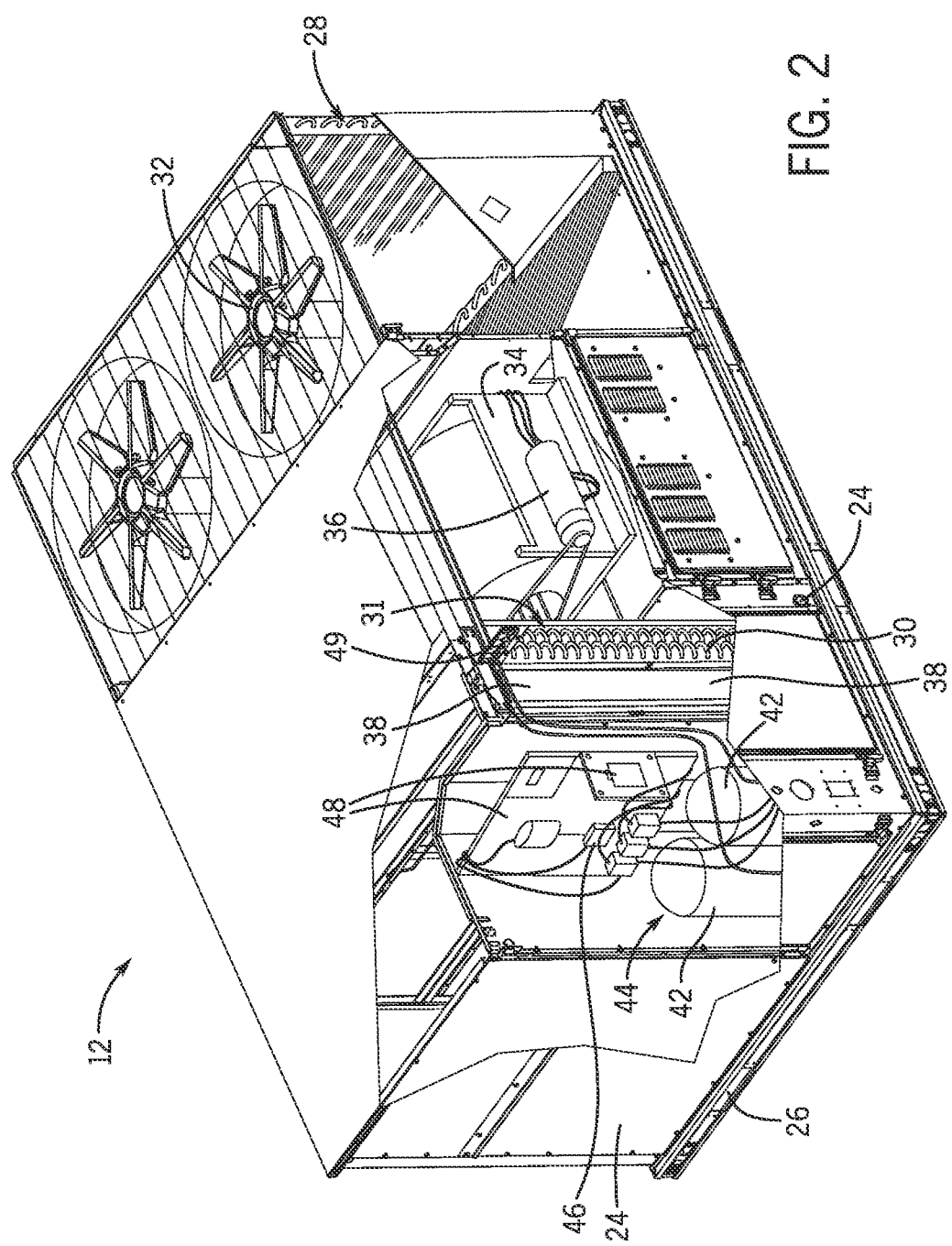
FIG. 2 is a perspective cutaway view of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
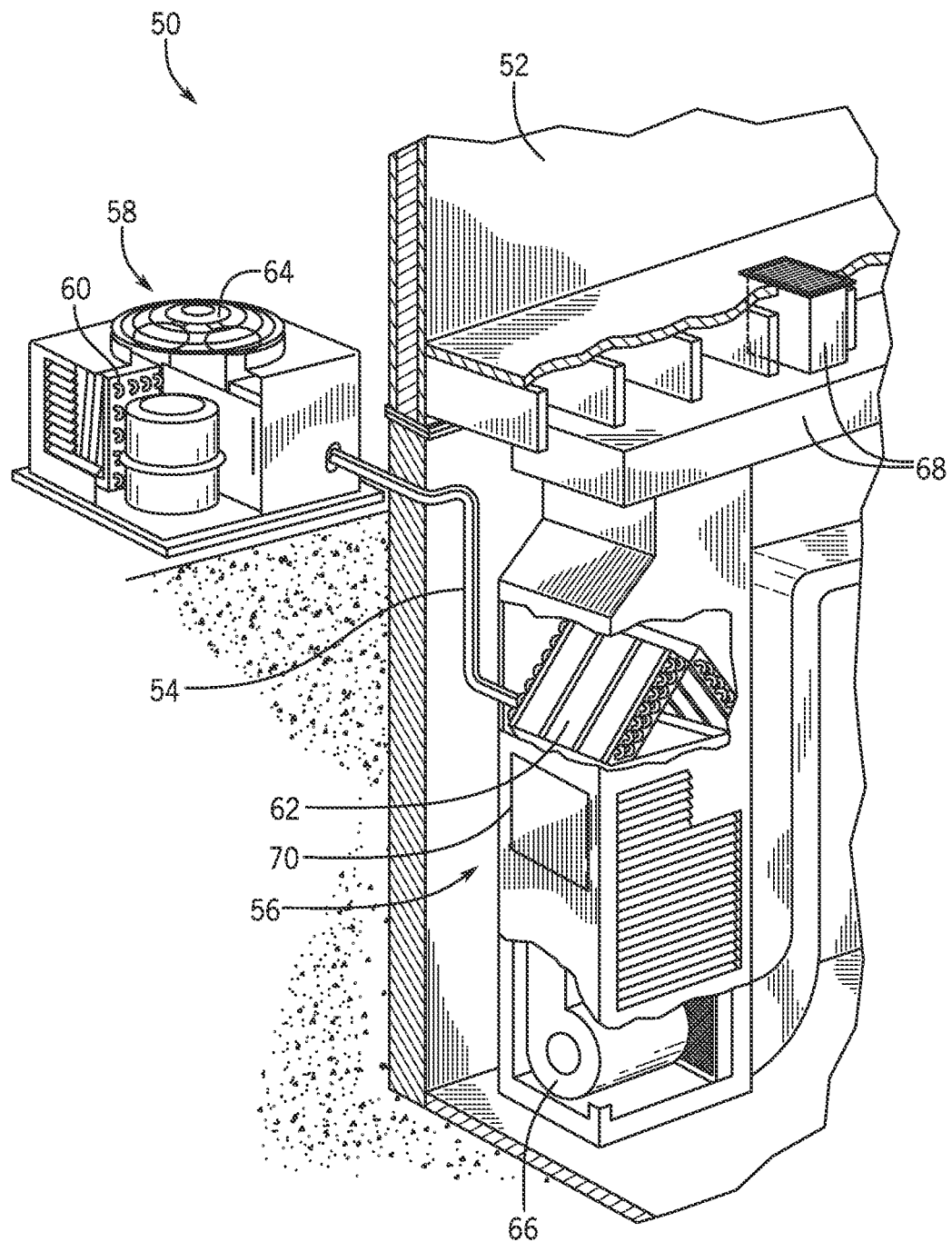
FIG. 3 is a perspective cutaway view of an embodiment of a split system of an HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates maintain a desired temperature as set by a system controller. When the temperature sensed inside the residence 52 is higher than the set point on the thermostat, or a set point plus a small amount, the residential heating and cooling system 50 may become operative refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
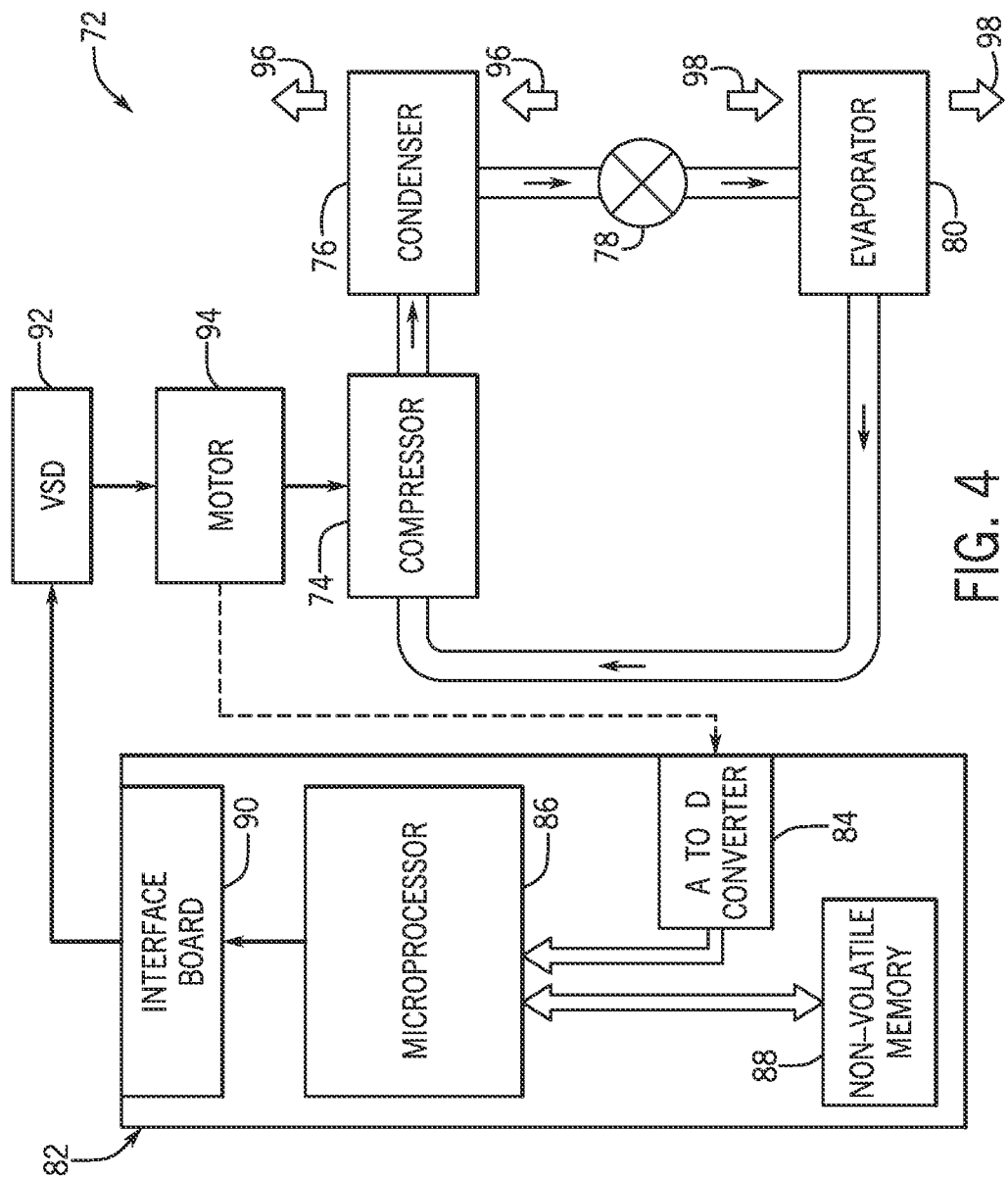
FIG. 4 is a schematic diagram of an embodiment of a vapor compression system of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
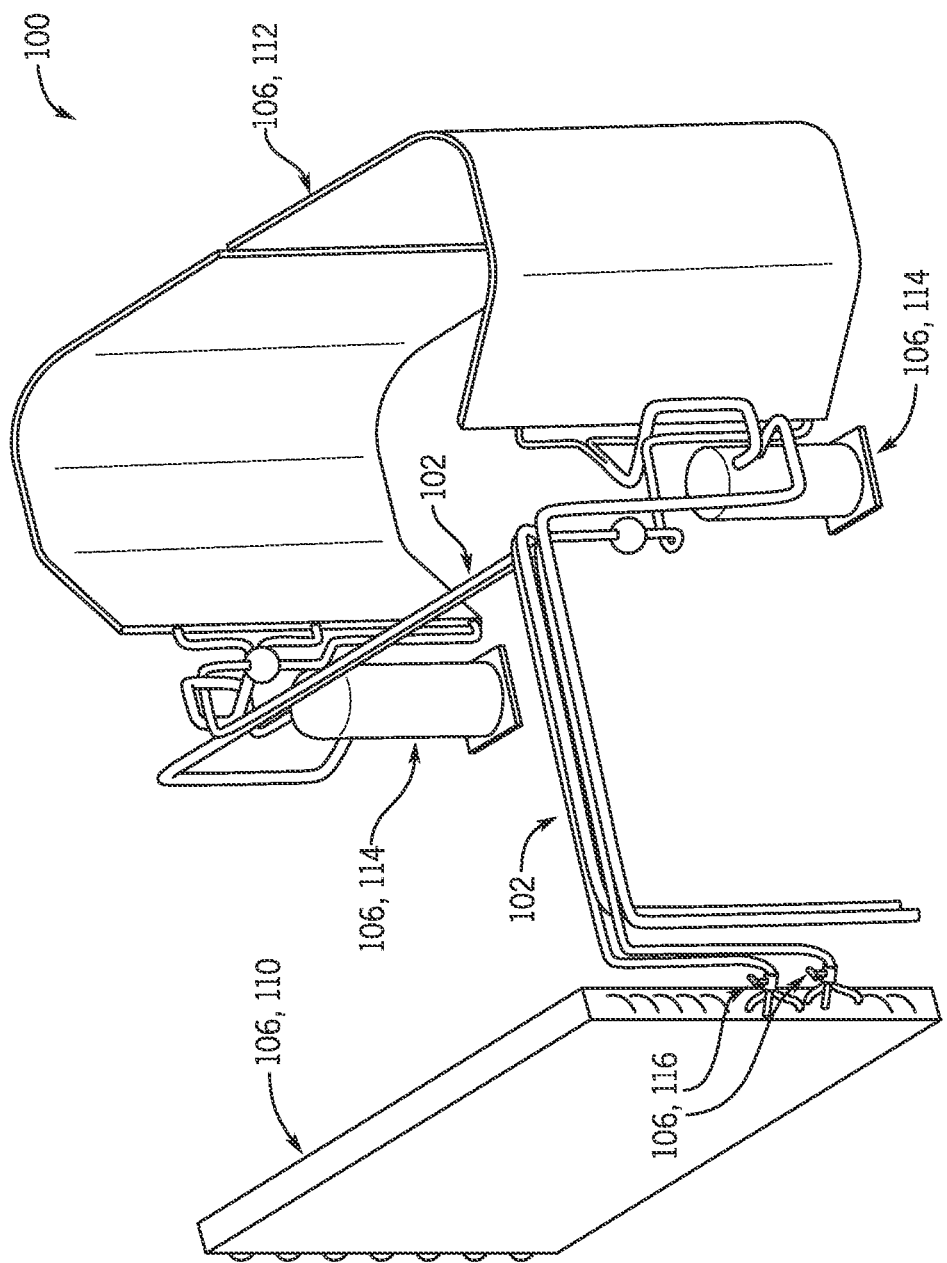
FIG. 5 is a perspective view of an embodiment of an HVAC packaged unit having composite interconnection conduits, in accordance with an aspect of the present disclosure.

FIG. 5 is a perspective view of an embodiment of an HVAC packaged unit 100 having composite interconnection conduits, or composite conduits 102, in accordance with an aspect of the present disclosure. For clarity, the HVAC packaged unit 100 is illustrated with an enclosure removed therefrom, although it is to be understood that any suitable enclosure, such as the cabinet 24 discussed above with reference to FIG. 2, may be disposed around the illustrated components of the HVAC packaged unit 100. The HVAC packaged unit 100 includes refrigerant circuit components, referred to herein as components 106, such as an evaporator 110, a condenser 112, compressors 114, and expansion devices 116. These components 106 operate similar to the previously introduced evaporators, condensers, compressors, and expansion devices of FIGS. 1-4. That is, each component 106 is configured to adjust an operating condition, such as a temperature, a pressure, or both, of a refrigerant flowing through the respective component 106. Moreover, because the components 106 are integrated within a common support structure, such as disposed within a common enclosure, the HVAC packaged unit 100 may effectively condition an interior space of the building 10 from outside of the interior space. For example, in some embodiments, the HVAC packaged unit 100 is a rooftop unit disposed on a rooftop of the building 10. In other embodiments, the HVAC packaged unit 100 may be positioned on a surface adjacent to the building 10 or within an unoccupied space within the building 10.

As previously mentioned, the composite conduits 102 fluidly couple the components 106 into a refrigerant circuit that enables the HVAC packaged unit 100 to condition the interior space of the building 10. It should be understood that the HVAC packaged unit 100 may include any suitable single or multiple refrigerant circuits having any suitable components 106 that are operably coupled to one another by the composite conduits 102. In contrast to the components 106, the composite conduits 102 do not substantially adjust the operating conditions of the refrigerant flowing through the composite conduits 102. As such, the composite conduits 102 are not configured for enabling the refrigerant to exchange heat with another fluid. Therefore, a material having a lower heat conductivity than copper may be utilized in the composite conduits 102.

Accordingly, the composite conduits 102 generally include main bodies formed from aluminum and pre-brazed end segments formed from copper. During assembly of the HVAC packaged unit 100, a technician may therefore use traditional copper-to-copper brazing techniques to couple the end segments of the composite conduits 102 to copper end joints or stubs of the components 106. In some embodiments, the HVAC packaged unit 100 additionally includes copper interconnection conduits that fluidly couple a first portion of the components 106 together in combination with the composite conduits 102 that fluidly couple a second portion of the components 106 together.

It should be understood that the aluminum material discussed herein may be any suitable aluminum-containing alloy, and similarly, that the copper material discussed herein may be any suitable copper-containing alloy. Moreover, although the discussion herein is focused on composite conduits 102 having main bodies formed from aluminum and pre-brazed end segments formed from copper, the techniques herein may be extended to any suitable combination of metals or alloys that enable end segments to be pre-brazed onto main bodies of the composite conduit 102. That is, the material for the end segments may be selected to correspond to the material of the end joints of the components 106, and the material for the main body may be selected based on its respective lower weight and lower cost than the material of the end segments.

With the above in mind, FIG. 6 is a schematic side view of an embodiment of one of the composite conduits 102 and two components 106 of the HVAC packaged unit 100, in accordance with an aspect of the present disclosure. Generally, the composite conduit 102 includes a main body 130 with a main body length 132 formed from aluminum. The composite conduit 102 is cylindrically-shaped in the present embodiment, though it should be understood that the composite conduit 102 may have any suitable tubular or other fluid-containing shape. As illustrated, a first end segment 134A or end portion of the composite conduit 102 is coupled to a first end 136A of the main body 130. Additionally, a second end segment 134B or end portion of the composite conduit 102 is coupled to a second end 136B of the main body 130. The end segments 134A, 134B are each formed from copper. Additionally, in the present embodiment, the end segments 134A, 134B each have an end segment length 144 that is less than the main body length 132, conserving the use of copper into portions of the composite conduit 102 that are to be coupled to the components 106. In some embodiments, the end segment length 144 is any suitable length that is less than the main body length 132. For example, in some embodiments, the end segment length 144 of each end segment 134A, 134B is 4 inches, 5 inches, 6 inches, 7 inches, 8 inches, or more, and the main body length 132 is 2 feet, 4 feet, 6 feet, 8 feet, or more. Moreover, the respective lengths 132, 144 of the composite conduit 102 portions each extend along a refrigerant flow direction 140, in the present embodiment.

To join the end segments 134A, 134B to the main body 130 of the composite conduit 102, copper-to-aluminum brazing techniques may be employed. That is, each end segment 134A, 134B may be brazed or coupled to one of the ends 136A, 136B of the main body 130, resulting in the composite conduit 102 that is lighter and has a lower material cost than a corresponding interconnection conduit fully formed from copper. Because a target temperature range for copper-to-aluminum brazing may be smaller than that of copper-to-copper brazing, pre-forming the composite conduits 102 during a manufacturing phase of the HVAC packaged unit 100 may desirably reduce a demand for practice changes at a later assembly phase of the HVAC packaged unit 100. Notably, the end segments 134A, 134B remain "segments" of the composite conduit 102 even after the end segments 13A, 134B are brazed to the main body 130 of the composite conduit 102. In other embodiments, any other suitable coupling process for joining the end segments 134A, 134B to the main body 130 may be used, such as welding, adhesives, mechanical locking interfaces, and so forth.

Moreover, the composite conduit 102 may be shaped by any suitable bending machine or device. In some embodiments, a manufacturer may use a bending machine, which is separate from a bending machine used for copper conduits, to introduce bends along the main body length 132 of the composite conduit 102. Such a practice may reduce or eliminate cross-contamination between copper and aluminum materials that may otherwise cause galvanic corrosion in the copper and aluminum materials. Additionally, due to limitations on physical space, certain bending machines may have a length threshold above which the composite conduit 102 may become too unwieldy to manage.

Accordingly, it may be efficient to manufacture composite conduits 102 of various standard lengths below the length threshold of the bending machine. Then, any desired bends may be introduced in the composite conduits 102. As discussed below, the pre-bent composite conduits 102 may then be coupled to the components 106 of the HVAC packaged unit 100. Additionally, as discussed below with reference to FIG. 7, the composite conduits 102 may also be coupled to additional composite conduits 102 to form a compound composite conduit that may have a length that is longer than the length threshold of the bending machine.

After the composite conduit 102 is formed, the composite conduit 102 may be coupled between any desired components 106 introduced above, such as a first component 106A and a second component 106B. In the illustrated embodiment, the first component 106A includes a first end joint 150A, and the second component 106B includes a second end joint 150B. Each end joint 150A, 150B is formed from copper in the present embodiment, thereby enabling a technician to efficiently braze the first end segment 134A the first end joint 150A. In this embodiment, the second end segment 134B may be similarly brazed to the second end joint 150B, thereby extending the composite conduit 102 between the first component 106A and the second component 106B. A partial refrigerant circuit assembly is thereby formed. However, it is to be understood that, in certain embodiments having a component 106 with an end joint 150 formed from aluminum, the second end segment 134B of the composite conduit 102 may be omitted, and the second end 136B of the main body 130 may be brazed directly to the end joint 150 formed from aluminum.

FIG. 7 is a schematic side view of an embodiment of a first composite conduit 102A coupled to a second composite conduit 102B, in accordance with an aspect of the present disclosure. The first composite conduit 102A corresponds to the composite conduit 102 discussed above with reference to FIG. 6, and as such, includes a first main body 130A having a first main body length 132A formed from aluminum. The first composite conduit 102A also includes a first end segment 134A coupled to a first end 136A of the first main body 130A and a second end segment 134B coupled to a second end 136B of the first main body 130A. Similarly, the second composite conduit 102B includes a second main body 130B formed from aluminum, a third end segment 134C coupled to a third end 136C of the second main body 130B, and a fourth end segment 134D coupled to a fourth end 136D of the second main body 130B.

Moreover, the second composite conduit 102B also includes a bend 160 formed between the third end 136C and the fourth end 136D of the second main body 130B. As such, the second main body 130B includes a second main body length 132B that meets a third main body length 132C at an angle 164. Although the second composite conduit 102B includes the bend 160 with the angle 164 that is approximately 90 degrees in the present embodiment, it is to be understood that any suitable number of bends 160 having any suitable angles 164 or target angles may be included in the composite conduits 102 of the HVAC packaged unit 100. As used herein, an angle that is described as "approximately" a particular value is intended to refer to an angle that is within 5% of the particular value. Moreover, the bend 160 may be formed such that a shape of the second composite conduit 102B corresponds to a geometry of the enclosure of the HVAC packaged unit 100.

To enable efficient coupling of the composite conduits 102A, 102B to one another, to components 106 of the HVAC packaged unit 100, or both, the end segments 134A, 134B, 134C, 134D are each formed from copper. For example, as illustrated, the second end segment 134B of the first composite conduit 102A is coupled to the third end segment 134C of the second composite conduit 102B. Accordingly, a resulting compound composite conduit 166 has an effective length that is longer than a total length of either composite conduit 102A, 102B. In some embodiments, the effective length may also be longer than the threshold length of the bending machine discussed above. With the desired length and shape of the compound composite conduit 166 formed, a technician may couple the first end segment 134A of the first composite conduit 102 to the first component 106A of the HVAC packaged unit 100, as discussed above. Additionally, the technician may couple the fourth end segment 134D of the second composite conduit 102B to the second component 106B of the HVAC packaged unit 100. Accordingly, the first composite conduit 102 is configured to extend between the first component 106A and the second composite conduit 102, and the second composite conduit 102 is configured to extend between the first composite conduit 102 and the second component 106B.

Figure 8:
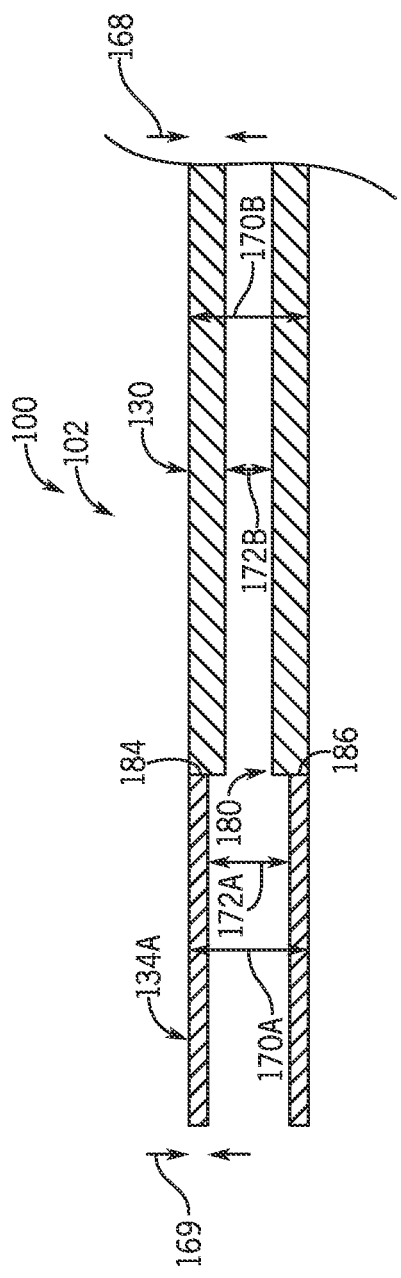
FIG. 8 is a cross-sectional schematic view of an embodiment of a portion of a composite interconnection conduit having a stepped end segment transition, in accordance with an aspect of the present disclosure.

Looking more closely at the composite conduits 102, FIG. 8 is a cross-sectional schematic view of an embodiment of a portion of one of the composite conduits 102, in accordance with an aspect of the present disclosure. Because aluminum is approximately one third as dense as copper, a greater thickness of material may be used for the aluminum conduit portions than for the copper conduit portions of the composite conduit 102 to enable operation of the composite conduit 102 at desired refrigerant pressures of the HVAC packaged unit 100. For example, the illustrated embodiment of the main body 130 has a main body thickness 168 that is greater than an end segment thickness 169 of the first end segment 134A. In some embodiments, the main body thickness 168 is larger than the end segment thickness 169 by 20%, 30%, 40%, 50%, 60%, or more. Although not presently illustrated, it should be understood that the second end segment 134B may also include the similar features described herein with reference to the first end segment 134A.

The first end segment 134A has a first outer diameter 170A and a first inner diameter 172A, and the main body 130 has a second outer diameter 170B and a second inner diameter 172B. The outer diameters 170A, 170B are substantially equal, such as within 5% of one another, thereby providing a uniform exterior dimension or shape of the composite conduit 102. However, because the second inner diameter 172B is less than the first inner diameter 173A, a stepped end segment transition 180 or stepped transition is formed between the first end segment 134A and the main body 130, in the present embodiment. Regardless of which direction the refrigerant may flow within the composite conduit 102, the stepped end segment transition 180 may cause a small or negligible pressure drop in the refrigerant flowing through the composite conduit 102. Moreover, although illustrated as having a longitudinal end 184 of the first end segment 134A coupled directly to a longitudinal end 186 of the main body 130, it is to be understood that either longitudinal end 184, 186 may alternatively be sized to receive and overlap the other longitudinal end 184, 186 to facilitate more efficient copper-to aluminum brazing.

Additionally, because relative costs of copper and aluminum may vary over time, there may be a threshold price ratio above which employing the composite conduits 102 is more cost-effective than employing similar, traditional copper interconnection conduits. For example, a manufacturer of the HVAC packaged unit 100 may implement the composite conduits 102 if a ratio of a price of copper per pound to a price of aluminum per pound is 2.0, 2.5, 3.0, or greater. During design of the HVAC packaged unit 100, the manufacturer may consider this relative material pricing with respect to a presently-recognized tradeoff. That is, the manufacture may consider and evaluate a decreased material cost and weight of using the composite conduits 102 versus an decreased number of brazes and less complex manufacturing process for using the traditional copper interconnection conduits. Based on analysis of this tradeoff, the manufacturer may implement the composite conduits 102 for some or all interconnection conduits of the HVAC packaged unit 100. Additionally, the manufacturer may determine that composite conduits 102 should be implemented for distances between components 106 that are greater than a distance threshold.

Figure 9:
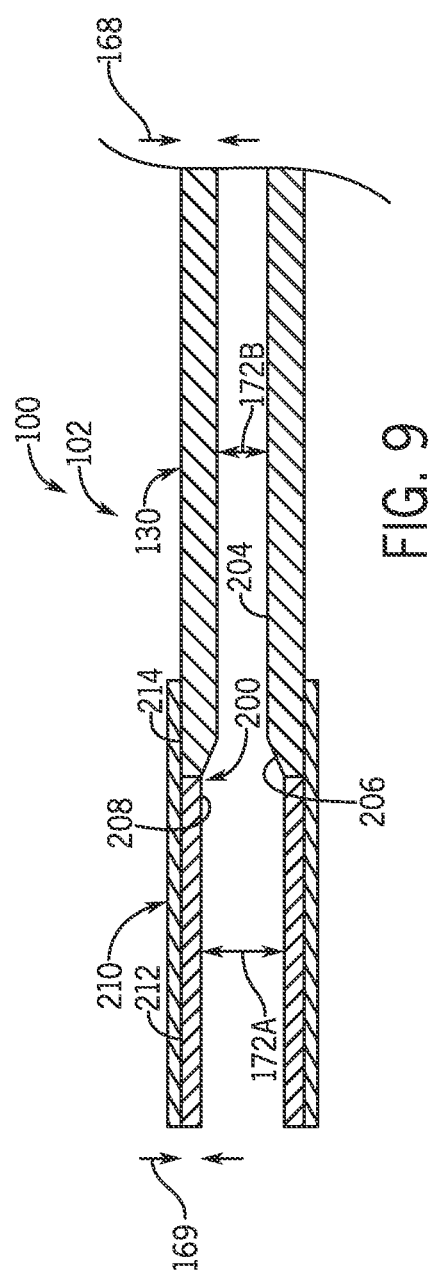
FIG. 9 is a cross-sectional schematic view of an embodiment of a portion of a composite interconnection conduit having a smooth end segment transition, in accordance with an aspect of the present disclosure.

FIG. 9 is a cross-sectional schematic view of another embodiment of a portion of the composite conduit 102, in accordance with an aspect of the present disclosure. Similar to the composite conduit 102 discussed with reference to FIG. 8 above, the illustrated composite conduit 102 includes the first end segment 134A having the end segment thickness 169 that is less than the main body thickness 168 of the main body 130. However, instead of the stepped end segment transition 180 of FIG. 8, the present embodiment of the composite conduit 102 includes a smooth end segment transition 200 or smooth transition, which is tapered between the first inner diameter 172A of the first end segment 134A and the second inner diameter 172B of the main body 130. As such, although the manufacturing process for such a transition may include additional processing steps, such as removing aluminum material from an inner surface 204 of the main body 130 to form a taper 206, the resulting composite conduit 102 may have a reduced pressure drop compared to the composite conduit 102 of FIG. 8. In other embodiments, the first end segment 134A may alternatively include a raised portion on an inner surface 208 of the first end segment 134A that forms the smooth end segment transition 200. It should be understood that the connection or transition between the first end segment 134A and the main body 130 may include any suitable shape for directing refrigerant within the composite conduit 102.

Moreover, the present embodiment of the composite conduit 102 includes a corrosion resistant treatment 210 disposed over an outer surface 212 of the first end segment 134A and a portion of an outer surface 214 of the main body 130. The corrosion resistant treatment 210 may be any suitable component or material that is configured to resist or prevent galvanic corrosion that may otherwise occur at contact areas between two different metals. In some embodiments, the corrosion resistant treatment 210 is a heat shrink tape, a protective tube, or a coating. In some embodiments, the corrosion resistant treatment 210 is also applied to or extended over a connection between the first end segment 134A and the end joint 150 of a component 106. Moreover, it is to be understood that the corrosion resistant treatment 210 may be applied to any suitable portions of the composite conduit 102 or may be omitted, in other embodiments.

Accordingly, embodiments discussed herein are directed to composite conduits 102 or composite interconnection conduits that have a main body 130 formed from aluminum and that have end segments 134 formed from copper. The aluminum end segments 134 may be pre-brazed onto respective ends 136 of the main body 130, enabling technicians to couple the composite conduits 102 to copper connections of components 106 of the HVAC packaged unit 100 via copper-to-copper brazing techniques. By utilizing lightweight aluminum for a significant length of the composite conduits 102, the resulting HVAC packaged unit 100 may have a material cost that is reduced by 10% or more compared to HVAC packaged units having interconnection conduits formed entirely of copper. Indeed, because the tubing cost of HVAC packaged units 100 may account for 1%, 2%, 3%, or more of the total cost of the HVAC packaged units 100, the material cost savings represent a significant cost benefit that may outweigh any manufacturing process complications involved with pre-brazing copper end segments 134 to the aluminum main body 130.

Moreover, the resulting HVAC packaged unit 100 has a reduced weight compared to other HVAC packaged units. As such, an installer may replace a lower capacity, relatively lighter HVAC packaged unit on a rooftop with the HVAC packaged unit 100 without implementing traditional structural reinforcements to the rooftop. In other embodiments, the HVAC packaged unit 100 may be manufactured with heavier heat exchange coils than a similar HVAC packaged unit without the composite conduits 102. In such embodiments, the weight savings provided by the composite conduits 102 may be utilized to increase or optimize an operating capacity of the HVAC packaged unit 100 for its given weight. The lighter-weight composite conduits 102 may additionally enable the installer to use a smaller crane or other installation equipment when installing the HVAC packaged unit 100 in an operating position, thereby reducing overhead costs associated with the HVAC packaged unit 100.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An interconnection conduit for a heating, ventilation, and/or air conditioning (HVAC) system, comprising:
a main body comprising a first inner diameter and a first conduit wall thickness, and the main body is formed from a first material;
a first end segment secured to a first end of the main body, wherein the first end segment comprises a second inner diameter greater than the first inner diameter and comprises a second conduit wall thickness less than the first conduit wall thickness, and wherein the first end segment is formed from a second material different from the first material; and
a second end segment secured to a second end of the main body, wherein the second end segment comprises a third inner diameter greater than the first inner diameter and comprises a third conduit wall thickness less than the first conduit wall thickness, wherein the second end segment is formed from the second material,
wherein the interconnection conduit is configured to extend between a first refrigerant circuit component and a second refrigerant circuit component within an enclosure of the HVAC system and to direct refrigerant between the first refrigerant circuit component and the second refrigerant circuit component.

2. The interconnection conduit of claim 1, comprising:
a first tapered transition between the first inner diameter and the second inner diameter; and
a second tapered transition between the first inner diameter and the third inner diameter.

3. The interconnection conduit of claim 1, wherein the first end segment is configured to be secured to a first end joint of the first refrigerant circuit component, and the second end segment is configured to be secured to a second end joint of the second refrigerant circuit component.

4. The interconnection conduit of claim 1, wherein the first end segment is brazed to the first end of the main body, and the second end segment is brazed to the second end of the main body.

5. The interconnection conduit of claim 1, wherein the first material is aluminum, and the second material is copper.

6. The interconnection conduit of claim 1, comprising:
a first stepped transition between the first inner diameter and the second inner diameter; and
a second stepped transition between the first inner diameter and the third inner diameter.

7. The interconnection conduit of claim 6, wherein the first end segment abuts the first end of the main body to define the first stepped transition, and the second end segment abuts the second end of the main body to define the second stepped transition.

8. The interconnection conduit of claim 1, wherein the main body comprises a first outer diameter, the first end segment comprises a second outer diameter, and the first outer diameter is substantially equal to the second outer diameter.

9. The interconnection conduit of claim 8, wherein the second end segment comprises a third outer dimeter substantially equal to the first outer diameter and the second outer diameter.

10. The interconnection conduit of claim 8, comprising a corrosion resistant treatment disposed on a first surface of the first outer diameter and on a second surface of the second outer diameter, wherein the corrosion resistant treatment extends continuously from the first surface to the second surface at the first end of the main body.

11. The interconnection conduit of claim 10, wherein the corrosion resistant treatment comprises heat shrink tape, a protective tube, or a coating.

12. An interconnection conduit for a heating, ventilation, and/or air conditioning (HVAC) system, comprising:
a main body comprising a first inner diameter, wherein the main body is formed from aluminum;
a first end segment comprising a second inner diameter greater than the first inner diameter, wherein the first end segment axially abuts a first end of the main body to define a first stepped transition between the first end segment and the main body, and wherein the first end segment is formed from copper; and
a second end segment comprising a third inner diameter greater than the first inner diameter, wherein the second end segment axially abuts a second end of the main body to define a second stepped transition between the second end segment and the main body, and wherein the second end segment is formed from copper,
wherein the interconnection conduit is configured to extend between a first refrigerant circuit component and a second refrigerant circuit component within an enclosure of the HVAC system and to direct refrigerant between the first refrigerant circuit component and the second refrigerant circuit component.

13. The interconnection conduit of claim 12, wherein the first end segment is brazed to the first end of the main body, and the second end segment is brazed to the second end of the main body.

14. The interconnection conduit of claim 12, wherein the first end segment is configured to be brazed to a first copper end joint of the first refrigerant circuit component, and the second end segment is configured to be brazed to a second copper end joint of the second refrigerant circuit component.

15. The interconnection conduit of claim 12, wherein the main body comprises a first conduit wall thickness, the first end segment comprises a second conduit wall thickness less than the first conduit wall thickness, and the second end segment comprises a third conduit wall thickness less than the first conduit wall thickness.

16. The interconnection conduit of claim 15, wherein the main body comprises a first outer diameter, the first end segment comprises a second outer diameter, the second end segment comprises a third outer diameter, and the first outer diameter, the second outer diameter, and the third outer diameter are substantially equal to one another.

17. The interconnection conduit of claim 16, comprising a corrosion resistant treatment disposed on a first surface of the first outer diameter, on a second surface of the second outer diameter, and on a third surface of the third outer diameter, wherein the corrosion resistant treatment extends continuously from the first surface to the second surface at the first end of the main body and extends continuously from the first surface to the third surface at the second end of the main body.

18. The interconnection conduit of claim 17, wherein the corrosion resistant treatment comprises heat shrink tape, a protective tube, or a coating.

19. An interconnection conduit for a heating, ventilation, and/or air conditioning (HVAC) system, comprising:
a main body comprising a first inner diameter and a first conduit wall thickness, wherein the main body is formed from aluminum;
a first end segment secured to and axially abutting a first end of the main body to define a first stepped transition between the first end segment and the main body, wherein the first end segment comprises a second inner diameter greater than the first inner diameter and comprises a second conduit wall thickness less than the first conduit wall thickness, and wherein the first end segment is formed from copper; and
a second end segment secured to and axially abutting a second end of the main body to define a second stepped transition between the second end segment and the main body, wherein the second end segment comprises a third inner diameter greater than the first inner diameter and comprises a third conduit wall thickness less than the first conduit wall thickness, and wherein the second end segment is formed from copper,
wherein the interconnection conduit is configured to extend between a first refrigerant circuit component and a second refrigerant circuit component within an enclosure of the HVAC system and to direct refrigerant between the first refrigerant circuit component and the second refrigerant circuit component.

20. The interconnection conduit of claim 19, wherein the first end segment is configured to be brazed to a first copper end joint of the first refrigerant circuit component, and the second end segment is configured to be brazed to a second copper end joint of the second refrigerant circuit component.

* * * * *